Oct. 14, 1958    C. R. CAMPBELL, JR., ET AL    2,855,600
AUTOMATIC DEVICES FOR INSERTING SCREWS
Filed May 4, 1954    4 Sheets-Sheet 1

Inventors
Charles R. Campbell, Jr.
William P. Crossen
Donald B. McIlvin
By their Attorney Oct. 14, 1958 C. R. CAMPBELL, JR., ET AL 2,855,600
AUTOMATIC DEVICES FOR INSERTING SCREWS
Filed May 4, 1954 4 Sheets-Sheet 3
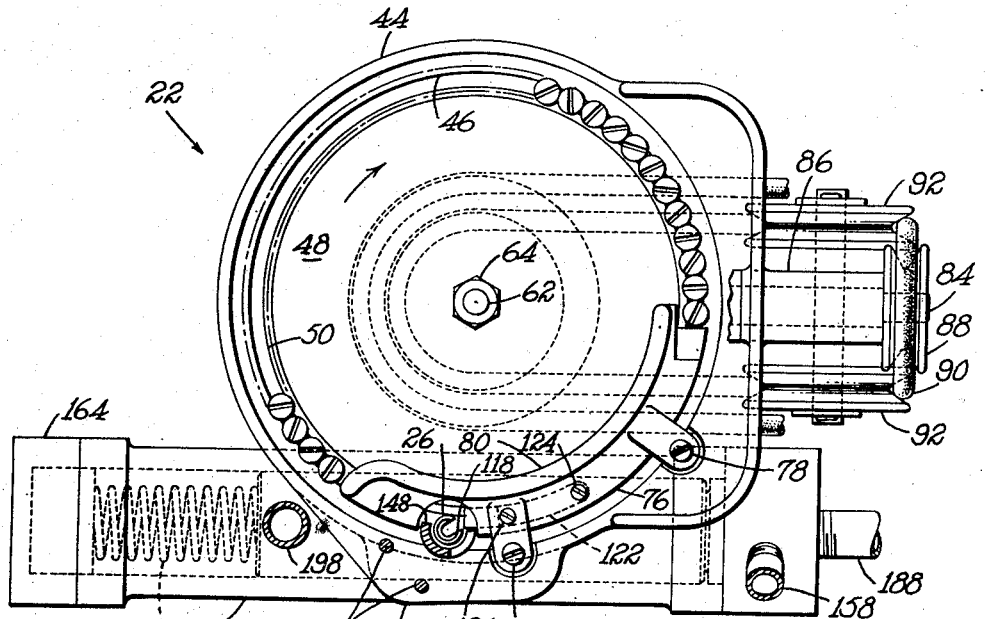
Fig.3
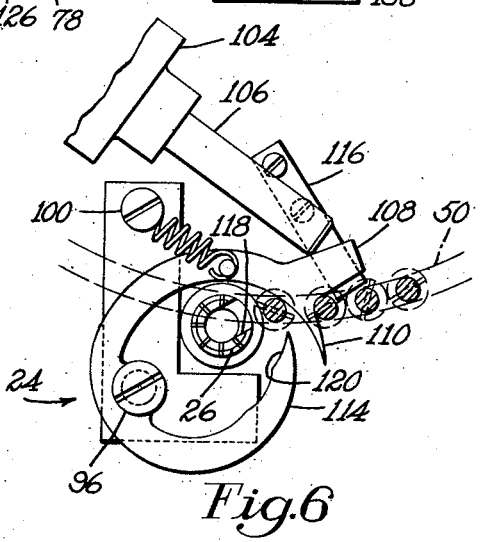
Fig.6
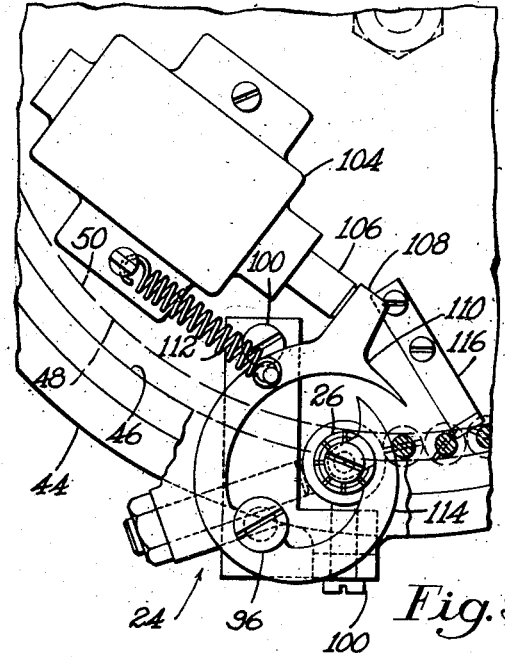
Fig.5
Inventors
Charles R. Campbell, Jr.
William P. Crossen
Donald B. McIluin
By their Attorney

Oct. 14, 1958  C. R. CAMPBELL, JR., ET AL  2,855,600
AUTOMATIC DEVICES FOR INSERTING SCREWS
Filed May 4, 1954  4 Sheets-Sheet 4

Inventors
Charles R. Campbell, Jr.
William P. Crossen
Donald B. McIlvin
By their Attorney United States Patent Office 2,855,600
Patented Oct. 14, 1958

2,855,600

AUTOMATIC DEVICES FOR INSERTING SCREWS

Charles R. Campbell, Jr., Beverly, William P. Crossen, Ipswich, and Donald B. McIlvin, Danvers, Mass., assignors to United Shoe Machinery Corporation, Flemington, N. J., a corporation of New Jersey Application May 4, 1954, Serial No. 427,634

10 Claims. (Cl. 1—1)

The present invention relates to devices for handling and inserting fasteners and more particularly to devices for automatically inserting threaded fasteners. While the present invention is herein illustrated as embodied in a portable, pneumatically operated device for automatically inserting screws, in certain of its novel aspects it is not limited to portable, automatic inserting devices nor to devicse for handling screws.

Devices for automatically inserting fasteners generally comprise in their broad combination a portable power operated inserting gun or driving tool, a remotely located supply of fasteners and means for delivering a single fastener to the inserting gun each time it is operated. The means for delivering a fastener to the inserting gun generally includes means for orienting fasteners with respect to their points, means for separating a single oriented fastener and means for pneumatically delivering the separated fastener to the inserting gun.

Since automatic inserting devices are dependent upon the operation of several more or less independent mechanisms, it is all the more necessary that each mechanism perform with a high degree of reliability in order that the combination itself may operate with a minimum of breakdowns. The need for reliability is particularly emphasized in automatic devices for inserting screws. There are at the present time many portable inserting guns available. Therefore, in addition to the convenience of automatic devices the only feature which makes such devices commercially attractive is the saving of time otherwise required for an operator to handle and manually position the screws.

Furthermore, since the savings to be derived from a wholly automatic device are of a marginal nature, it is essential that their construction be simple and efficient. Among other things they must be economical in their use of power. As was pointed out above, pneumatic means are usually provided to deliver a separated fastener to the inserting gun. The blast of air to accomplish this purpose must necessarily be of a controlled amount and the mechanism for providing it of simple construction.

It is an object of the present invention to provide an automatic device for inserting fasteners wherein improved means are provided for separating a single fastener.

It is another object of the present invention to provide improved and simplified means for pneumatically delivering a separated fastener to an inserting gun.

Hoppers of the type disclosed in United States Letters Patent No. 1,948,499, granted February 27, 1934, in the name of F. E. Bertrand have long been used for orienting and separating headed fasteners. These hoppers comprise a main frame having a circular surface and a rotating disk the outer periphery of which is spaced from the diameter of the frame to form a slot. Screws placed on the disk are agitated so that they eventually fall with their shanks extending through the slot. They are then carried around the circular surface by the rotation of the disk to a point where they are discharged one at a time from the hopper in their oriented condition. In the device shown in the above-mentioned patent the screws enter a spring-fingered gate or sleeve and are discharged downwardly therefrom by a plunger.

Experience has shown that this type of hopper and separating arrangement is often unreliable in that screws will jam as they enter the gate. As a feature of the present invention, a picker finger has been provided which automatically inserts a single secrew into the gate while at the same time holding other screws at a spaced distance away from the gate so that no possibility of a jam will arise.

As a further feature of the present invention, an accumulator is provided which is charged with compressed air during the operation of the inserting gun. When an operation of the inserting gun is completed, the air compressed within the accumulator is released to deliver a separated fastener along a delivery tube to the inserting gun.

The above and other features of the invention including various novel details of construction and combination of parts will now be more particularly described with reference to the accompanying drawings and pointed out in the claims.

In the drawings,

Fig. 3 is a plan view of the hopper and separating mechanism seen in Fig. 2 with certain parts omitted for clarity;

Fig. 4 is a view in elevation on a further enlarged scale of certain elements seen in Fig. 2 with certain parts broken away for clarity and others in section;

Fig. 5 is a plan view of certain elements shown in Fig. 4;

Fig. 6 is a fragmenetary view of certain elements of Fig. 5 in an alternate operating position; and, Fig. 7 is a diagrammatic view of the various mechanisms for controlling air flow and their relation to the operating elements of the present device when connected to a supply of pressurized fluid preferably compressed air.

Figure 1:
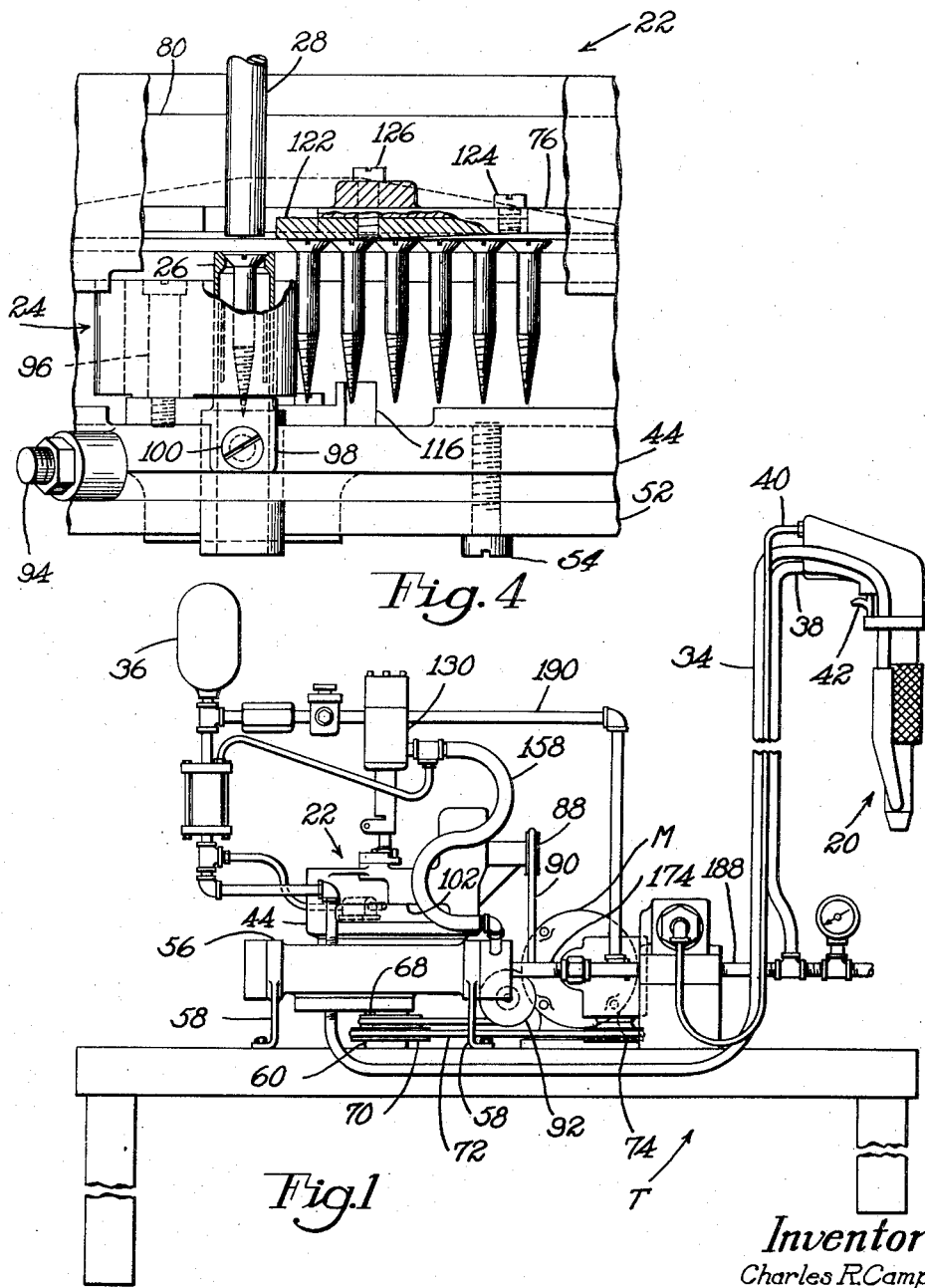
Fig. 1 is a general view in elevation showing a portable inserting gun or driving tool, a remote and substantially stationary hopper for holding a supply of fasteners and associated mechanism for delivering a single fastener to the inserting gun.
Figure 2:
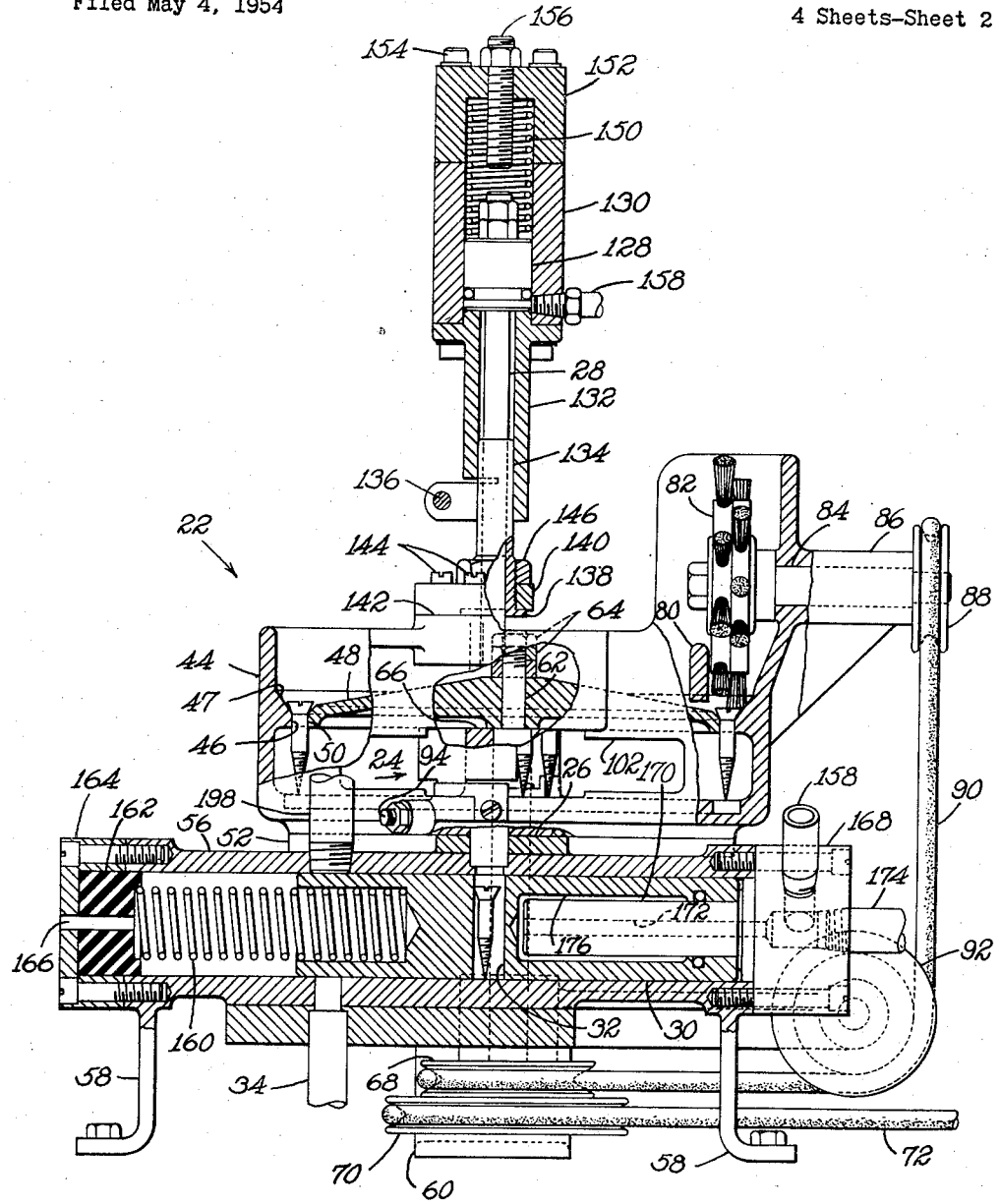
Fig. 2 is a view of the hopper and the separating mechanism seen in Fig. 1 on an enlarged scale and partly in section.

Referring now to Fig. 1, the general arrangement of the various elements of the present invention may be seen. An inserting gun or driving tool 20 is provided for automatically inserting screws remotely from a heterogeneous supply contained in a hopper 22. Means for delivering a single screw to the gun 20 include a reciprocating picker finger 24 which positions oriented fasteners one at a time into a spring-fingered gate 26 (Figs. 5 and 6) from which they are discharged by a plunger 28 downwardly to a piston 30 having a bore 32 (Fig. 2). The piston 30 is adapted to be displaced to bring the bore 32 in register with a delivery tube 34 extending to the nozzle of the inserting gun 20. Air for delivering a separated fastener along the delivery tube 34 is compressed within an accumulator 36. A line 38 extending to the gun 20 provides air for operating an air motor which in turn rotates a conventional driver to drive a fastener positioned in the nozzle of the gun. A signal line 40 also extends from the gun 20 to a point adjacent the hopper 22. The gun 20 is actuated by depression of a trigger 42. During operation of the gun 20 the signal line 40 is pressurized to actuate various controlled mechanisms which provide for the operation of the picker finger 24, plunger 28 and the means for venting the air compressed within the accumulator 36 to deliver the separated fastener to the inserting gun.

The hopper 22 is essentially of the same construction as the hopper disclosed in the above-mentioned patent with the exception of the picker finger 24 and the means for operating the plunger 28. It comprises an essentially circular frame 44 having a machined circular surface 46 above which is a conical surface 47. A rotating conical disk 48 has its outer periphery spaced from the surface 46 to provide a circular slot 50. The frame 44 has a plate 52 secured to its bottom surface by screws 54 (Fig. 4). One end of the plate 52 is fastened, as by welding, to a cylinder 56 which has formed integrally at each end legs 58 (Figs. 1 and 2) which rest upon and may be secured to a table T. The opposite side of the frame 44 is supported by a third leg 60 which is attached to the plate 52. The disk 48 is secured to a shaft 62 by nuts 64 and is maintained in proper relation to the surface 46 by engagement with a machined boss 66 formed on the frame 44 (Fig. 2). The shaft 62 extends downwardly and at its lower end are secured two pulleys 68 and 70. A round belt 72 extending around the pulley 70 and a pulley 74 secured to the output shaft of a continuously operating motor M provides for rotation of the disk 48.

A portion of the slot 50 is covered by a bracket 76 (Fig. 3) secured to the frame 44 by screws 78. The bracket 76 has an upstanding rib 80 (Fig. 2) which enables a supply of screws or other fasteners to be dumped into the hopper 22 primarily upon the disk 48 in heterogeneous fashion. As the disk rotates in a clockwise direction (Fig. 3), the screws fall with their shanks extending through the slot 50 and with their heads resting upon the surface 47 and the disk 48. The screws within the slot 48 are thus carried beneath the bracket 76.

A brush 82 rotating above the slot 50 prevents any screws which are not properly disposed in the slot 50 from passing beneath the bracket 76. The brush 82 constantly rotates in a direction to clear such screws away from the bracket 76 through the following arrangement. The brush 82 is secured to a shaft 84 journaled in a projection 86 from the frame 44. A pulley 88 is secured at the other end of the shaft 84 and a round belt 90 passes around this pulley and two pulleys 92 mounted in alignment with the pulley 68. The belt 90 continues around the continuously rotating pulley 68 thereby providing rotation of the brush 82.

The spring-fingered gate 26 has its upper end disposed just beneath the lower surface of the rotating disk 48 and extends downwardly through the plate 52 into a recess formed in the cylinder 56 being held in this position by a screw 94 threaded into the frame 44. The picker finger 24 is mounted for pivotal movement about a screw 96 threaded into a bracket 98 which is secured to the frame 44 by screws 100. It will be noted that the side of the frame 44 is provided with an opening 102 (Fig. 2) which enables mounting of the bracket 98 and permits access to the area adjacent the picker finger 24. A cylinder 104 secured to the frame 44 beneath the rotating disk 48 is provided with a plunger 106 which engages a lug 108 formed on a leg 110 of the picker 24. A tension spring 112 normally maintains the lug 108 in engagement with the plunger 106 as is shown in Fig. 5. In this position the endmost screw in the slot 50 bears against a second leg 114 formed on the picker finger 24. The plunger 106 is adapted to be displaced in a manner which is described below to a second position, shown in Fig. 6, thereby rotating the picker 24. This movement is limited by a lipped member 116 which is also secured to the frame 44. When the picker finer is shifted from the position shown in Fig. 5 to that shown in Fig. 6, the pointed leg 110 passes between the endmost two screws advancing the endmost screw by reason of the cam shape formed on its inner surface toward the gate 26. When the picker 24 returns to the position shown in Fig. 5, the endmost fastening is then cammed through a slot 118 in the upper end of the gate 26 by a cam surface 120 formed on the inside of the leg 114. Thus the endmost fastener is separated in a positive manner while the remaining fasteners in the slot 50 are held at a spaced distance away from the gate 26. It will be noted that the picker 24 is of substantial height to prevent tipping of fasteners so that their points can inadvertently enter the slot 118. To further prevent tipping or tilting of screws a plate 122 is secured to the bracket 76 by a screw 124 and its outer end may be adjusted by a screw 126 so that it bears against the endmost screws in the slot 50.

The plunger 28 is positioned just above the gate 26 and extends upwardly to a point where its upper end is secured to a piston 128. The piston 128 rides in a cylinder 130 which is secured to the frame 44 in the following manner.

A casing 132 attached to the lower end of the cylinder 130 is secured to a tubular member 134 by a clamping screw 136. The member 134 has an integral flange 138 which bears against the underside of a bracket 140 which is secured to a lug 142 projecting from the frame 44 by screws 144. A nut 146 threaded on the tubular member 134 secures it in its fixed position. The tubular member 134 also has a depending leg 148 (Fig. 3) at the lower end of which is formed a surface corresponding to the surface 47 of the frame 44 for facilitating the entry of screws into the gate 26. The plunger 28 and the piston 128 are normally held in a downward position by a compression spring 150 which bears against a cap 152 secured to the cylinder 130 by screws 154. A screw 156 threaded into the cap 152 limits the upward motion of the piston 128 and the plunger 28 when air is introduced through a line 158 in a manner which is described below.

The piston 30 (Fig. 2) is urged toward a position where its bore 32 is in a fastener receiving position in register with the gate 26, by a compression spring 160 which acts between one end of the piston and a shock absorbing pad 162 which is held in place by an end cap 164. A bore 166 vents this side of the piston 30 to atmosphere (Fig. 2). A cap 168 secured to the other end of the cylinder 56 carries a shaft 170 upon which the piston 30 rides, said shaft having a flange which limits the action of the spring 160. The shaft 170 is provided with a bore 172 which communicates with an air line 174. When the air line 174 is pressurized, air pressure acting against the end of an internal bore 176 within the piston 30 displaces the piston toward the left to a fastener delivering position wherein the bore 32 is in register with the delivery tube 34.

The inserting gun or driving tool 20 is of standard and well-known construction except for the addition of the delivery tube 34 which utilizes a telescoping construction to enable delivery of a fastener to the nozzle of the gun. The manner of this construction is obvious to anyone skilled in the art and as such a feature does not form a part of the present invention it is merely indicated in Figs. 1 and 7. Also a further passageway 178 to which the signal line 40 is connected communicates with the passageway leading to the air motor of the gun 20. The trigger 42 controls a valve 179 which when it is depressed permits flow of air from the line 38 to the air motor of the gun 20 and at the same time pressurizes the passageway 178 and the signal line 40. The means for pressurizing the signal line 40 and for controlling flow of air to the air motor of the gun 20 are indicated only diagrammatically in Fig. 7 as any of a number of well-known devices would suffice for that purpose.

Figure 7:
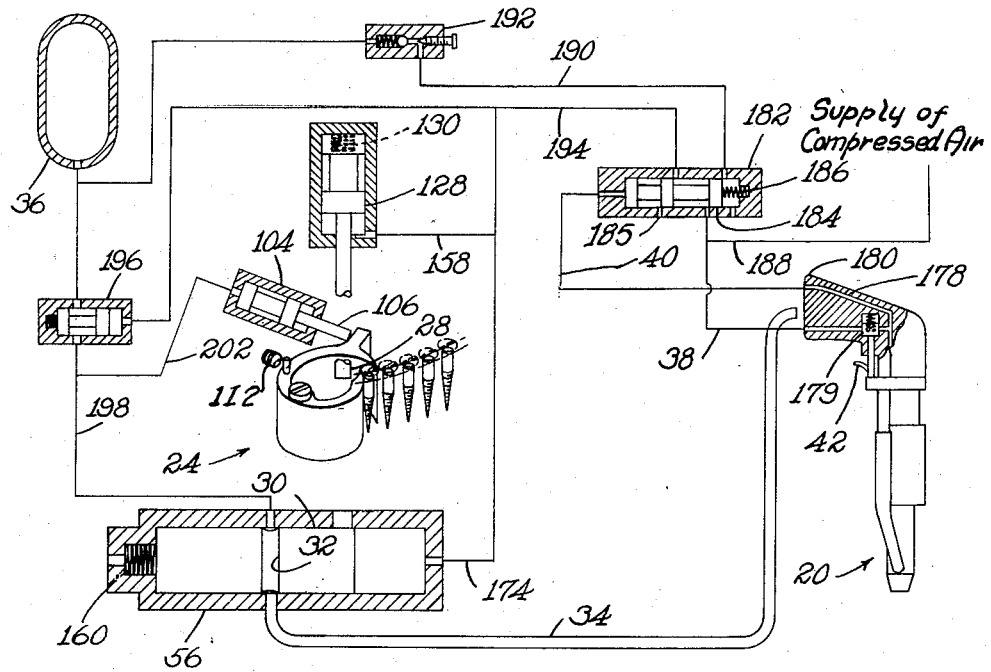

The various operating elements of the present device with the exception of the disk 48 and the brush 82 are pneumatically operated by various valves and cylinders which are most clearly seen in the diagrammatic view of Fig. 7. A control valve 182 having a spool 184 which is normally maintained in a first position by an internal spring 186 is provided for controlling the flow of air to the various operating elements. One port of the valve 182 is connected at all times to a line 188 extending to a source of pressurized air (not shown). A first line 190 extends from the control valve 182 to the accumulator 36. A one-way valve 192 is interposed in this line to permit flow of air only in a direction from the control valve 182 to the accumulator 36. A second line 194 extends from the control valve 182 and communicates with the piston 128, the piston 30 and shut-off valve 196 which, before the system is connected to a supply of compressed air, is spring-biased to a closed position. A port 185 in the control valve 182 is provided for venting the line 194 to atmosphere during the operation of the valve when the spool 184 is moved to the right against the action of the spring 186. The shut-off valve 196 is interposed in a line 198 which extends from the accumulator 36 to the cylinder 56 in such a manner that the line 198 is in communication with the delivery tube 34 when the piston 30 is in a fastener delivering position. A further line 202 extends between the cylinder 104 and the line 198 at a point between the valve 196 and the cylinder 56.

When the present device is in its rest or ready condition and connected to a source of compressed air as depicted in Fig. 7 the control valve 182 causes the line 194 to be pressurized by placing said line 194 in communication with the line 188 which in turn leads to the source of compressed air. In the ready position the various components assume the following positions in response to the pressure in line 194; the piston 30 is displaced with its fastener carrying bore 32 in a fastener delivery position in alinement with the delivery tube 34 and the line 198 leading from the accumulator 36. The picker 24 under the action of the spring 112 is in readiness the deliver a fastener to the gate 26 (not shown in Fig. 7). The plunger 28 is displaced upwardly in readiness to discharge a fastener from the spring fingered gate 26. The shut-off valve 196 is displaced to its open position venting the accumulator 36 to atmosphere through the line 198, bore 32, and delivery tube 34. The line 190 is vented to atmosphere through the control valve 182.

With the various elements in the positions described above the inserting gun 20 may be operated by actuation of the trigger 42. Operation of the gun is accomplished by flow of air from the lines 188 and 38 through the valve 179 to the conventional air motor contained within the gun 20. Actuation of the trigger 42 and valve 179 also causes pressurization of the signal line 40 by placing it in communication with the air supply line 188 through the internal passageway 178. Pressurization of the signal line 40 in response to operation of the gun 20 causes the spool 184 of the control valve 182 to be displaced to its right hand position. In the right hand position of the spool 184 the line 194 is vented to atmosphere through the port 185 of the control valve 182 and simultaneously the line 190 becomes pressurized. Depressurization of the line 194 causes the following events to occur substantially simultaneously: the piston 30 moves toward the right under the action of the spring 160 to bring the bore 32 into a fastener receiving position beneath the gate 26. The plunger 28 moves downwardly under the action of the spring 130 to discharge a fastener from the gate towards the piston 30, and the spring biased valve 196 moves to its shut position. At the same time air flows through the line 190 and the one-way valve 192 to charge the accumulator 36 with a supply of compressed air. The spring biased valve 196 being in a shut position prevents escape of air from the accumulator 36. The presently described condition is maintained so long as the inserting gun is being operated by actuation of the trigger 42.

When the inserting operation is complete and the trigger 42 is released the signal line 40 is depressurized by the escape of air through the air motor of the inserting gun. Depressurization of the signal line 40 allows the spool 184 of the control valve 182 to move to its left-hand position under the action of the spring 186. In this position of the control valve 182, the line 190 is depressurized, and the line 194 is pressurized causing the various operative parts to assume the positions shown in Fig. 7 in accord with the description of the ready position of the present device given above. However, a further event occurs immediately after the release of the trigger 42. When the spring biased valve 196 is displaced to its open position the air charge in the accumulator passes rapidly along the line 198. This charge of air passes through the line 198 rather than the line 190 because the latter is blocked by the valve 192. As the line 198 is pressurized by the charge of air from the accumulator 36, the plunger 106 of the air motor 104 rotates the picker 194 to bring a fastener into a preparatory position for being introduced into the gate 26 as shown in Fig. 6. At the same time the fastener which had previously been discharged from the gate 26 by the plunger 28 is carried by the piston 30 to a position where it is in alinement with the delivery tube 34 since lines 194, 174 were pressurized upon release of the trigger. The air charge in the line 198 then carries the fastener along the delivery tube 34 to the inserting gun 20. It will be noted that pressurization of the line 198 occurs for a relatively short time immediately after the trigger 42 is released. Therefore, the plunger 106 is soon returned to the position shown in Fig. 7 as the picker 24 is rotated under the action of the spring 112 to introduce a further fastener into the gate 26 preparatory to the next operation of the gun 20, the plunger 28 having previously been retracted from the gate 26 when the line 194 was first pressurized.

The sequence of operation of the control valve 182 is of little importance. That is, the line 190 could be pressurized in the ready position rather than the line 194, the resulting difference being that a fastener would be delivered to the inserting gun immediately after depression of the trigger 42 rather than immediately after it is released. The present arrangement is preferred for devices which insert screws due to the relatively long operating period. However, in the case of a nail inserting device where fasteners are inserted by a single blow of an air motor it is often desirable to deliver the fastener during the operation of the inserting device instead of immediately after its operation. Furthermore, the novel provision of an accumulator for providing a predetermined charge of air to deliver a fastener from a remote supply to an inserting device may be utilized in many other inserting devices than the specific one herein described. The same holds true for the specific combination of the hopper herein described and the picker 24 which effectively eliminates problems of jamming in the separating mechanism.

Having thus described our invention, what we claim as new and desire to secure by Letters Patent of the United States is:

1. An apparatus for inserting fasteners and the like, comprising, in combination, a driving tool, means for supporting a plurality of fasteners with their ends uniformly oriented with respect to each other, a delivery conduit for guiding fasteners from a point adjacent said supporting means to said driving tool, means for separating a single fastener from said supporting means and disposing it is said delivery conduit, said separating means being operable in timed sequence with the actuation of said driving tool, an accumulator communicable with a source of pressurized fluid, a control valve normally preventing flow of pressurized fluid to said accumulator, means for opening said control valve to charge said accumulator with pressurized fluid only when said tool is operated, and means for placing said accumulator in open communication with said delivery conduit while a fastener is disposed therein whereby said fastener is propelled to said driving tool by the charge of pressurized fluid in the accumulator.

2. An apparatus for inserting fasteners and the like, comprising, in combination, a driving tool, means for supporting a plurality of fasteners with their ends uniformly oriented with respect to each other, a delivery conduit for guiding fasteners from a point adjacent said supporting means to said driving tool, means for separating a single fastener from said supporting means and disposing it in said delivery conduit, said separating means being operable in timed sequence with the actuation of said tool, an accumulator communicable with a source of pressurized fluid, a control valve normally preventing flow of pressurized fluid to said accumulator, means for opening said control valve to charge said accumulator with pressurized fluid only when said tool is operated, a line which places the accumulator in communication with said delivery conduit, a valve interposed in said line movable to a closed position when said control valve is opened to facilitate the accumulation of a charge of pressurized fluid in the accumulator, and means operable each time said driving tool is operated for opening said valve whereby said fastener is propelled to said driving tool by the charge of fluid in the accumulator.

3. An apparatus for inserting fasteners and the like, comprising, in combination, a driving tool, means for supporting a plurality of fasteners with their ends uniformly oriented with respect to each other, a delivery conduit for guiding fasteners from a point adjacent said supporting means to said driving tool, an accumulator, a line placing the accumulator in communication with a source of pressurized fluid, a control valve interposed in said line operable in timed sequence with said driving tool, a second line placing said accumulator in communication with said delivery conduit, a shut-off valve interposed in said second line, means responsive to the operation of said control valve for separating a single fastener from said supporting means and disposing it in said delivery conduit, means for maintaining said shut-off valve closed while said control valve is open, whereby a charge of pressurized fluid is built up in the accumulator, means for closing said control valve after the charge is built up in the accumulator, and means for opening the shut-off valve while the control valve is closed, whereby a measured charge of pressurized fluid is provided to propel the fastener disposed in said delivery conduit to said driving tool.

4. An apparatus for inserting fasteners and the like, comprising, in combination, a driving tool, means for supporting a plurality of fasteners with their ends uniformly oriented with respect to each other, a delivery conduit for guiding fasteners from a point adjacent said supporting means to said driving tool, means for separating a single fastener from said supporting means and disposing it in said delivery conduit, said separating means being operable in timed sequence with the actuation of said driving tool, an accumulator, a line placing the accumulator in communication with a source of pressurized fluid, a control valve interposed in said line, a second line placing said accumulator in communication with said delivery conduit, a shut-off valve interposed in said second line, said control valve and said shut-off valve being operable to move between open and closed positions in reverse order in timed sequence with the actuation of said driving tool, whereby a measured charge of pressurized fluid is provided to propel the fastener disposed in said delivery conduit to said driving tool.

5. An apparatus for inserting fasteners and the like, comprising, in combination, a driving tool, means for supporting a plurality of fasteners with their ends uniformly oriented with respect to each other, a delivery conduit for guiding fasteners from a point adjacent said supporting means to said driving tool, means for separating a single fastener from said supporting means and disposing it in said delivery conduit, said separating means being operable in timed sequence with the actuation of said driving tool, an accumulator, a line placing the accumulator in communication with a source of pressurized fluid, a control valve interposed in said line, a second line placing said accumulator in communication with said delivery conduit, a shut-off valve interposed in said second line, said control valve and said shut-off valve being operable to move between open and closed positions in reverse order in timed sequence with the actuation of said driving tool, whereby a measured charge of pressurized fluid is provided to propel the fastener disposed in said delivery conduit to said driving tool, and a one way valve interposed in the line extending between said accumulator and said control valve so that pressurized fluid will not pass from the accumulator to said control valve.

6. An apparatus for inserting fasteners and the like, comprising, in combination, a driving tool, means for supporting a plurality of fasteners with their ends uniformly oriented with respect to each other, a delivery conduit for guiding fasteners from a point adjacent said supporting means to said driving tool, means for separating a single fastener from said supporting means and disposing it in said delivery conduit, said separating means being operable in timed sequence with the actuation of said driving tool, an accumulator, a line placing the accumulator in communication with a source of pressurized fluid, a control valve interposed in said line, a second line placing said accumulator in communication with said delivery conduit, a shut-off valve interposed in said second line, said control valve and said shut-off valve being operable to move between open and closed positions in reverse order in timed sequence with the actuation of said driving tool, whereby a measured charge of pressurized fluid is provided to propel the fastener disposed in said delivery conduit to said driving tool, spring means for closing said shut-off valve when said driving tool is operated, pneumatic means for opening said shut-off valve when the operation of said driving tool ceases, pneumatic means for opening said control valve when said driving tool is operated, and spring means for closing said control valve when the operation of said driving tool ceases.

7. In an apparatus for transferring fasteners and the like, means for supporting a plurality of fasteners with their ends uniformly oriented with respect to each other, a delivery conduit for guiding fasteners from a point adjacent said supporting means to a predetermined destination, means for separating a single fastener from said supporting means and disposing it in said delivery conduit, an accumulator commuicable with a source of pressurized fluid, a control valve normally preventing flow of pressurized fluid to said accumulator, means for opening said control valve to charge said accumulator with pressurized fluid upon receipt of an external signal, a line which places the accumulator in communication with said delivery conduit, a valve interposed in said line and movable to a closed position when said control valve is opened to facilitate the accumulation of pressurized fluid in the accumulator, and means operable in timed sequence with said separating means for opening said valve whereby said fastener is propelled to its predetermined destination by the charge of fluid in the accumulator.

8. In an apparatus for transferring fasteners and the like, means for supporting a plurality of fasteners with their ends uniformly oriented with respect to each other, a delivery conduit for guiding fasteners from a point adjacent said supporting means to a predetermined destination, an accumulator, a line which places the accumulator in communication with a source of pressurized fluid, a control valve interposed in said line operable in response to an external signal, a second line placing the accumulator in communication with said delivery conduit, a shut-off valve interposed in said second line, means responsive to the operation of said control valve for separating a single fastener from said supporting means and disposing it in said delivery conduit, means for maintaining said shut-off valve closed while the control valve is open, whereby a charge of air is built up in the accumulator, means for closing said control valve after the charge is built up in the accumulator, and means for opening the shut-off valve while the control valve is closed, whereby a measured charge of pressurized fluid is provided to propel the fastener disposed in the delivery conduit to said predetermined destination.

9. In an apparatus for transferring fasteners and the like, means for supporting a plurality of fasteners with their ends uniformly oriented with respect to each other, a delivery conduit for guiding the fasteners from a point adjacent said supporting means to a predetermined destination, an accumulator, a line which places the accumulator in communication with a source of pressurized fluid, a control valve interposed in said line operable in response to an external signal, a second line placing the accumulator in communication with said delivery conduit, and a shut-off valve interposed in said second line, means responsive to the operation of said control valve for separating a single fastener from said supporting means and disposing it in said delivery conduit, said control valve and said shut-off valve being operable to move between open and closed positions in reverse order in timed sequence with the operation of said separating means, whereby a measured charge of pressurized fluid is provided for propelling said fastener disposed within the delivery conduit to its predetermined destination.

10. In an apparatus for transferring fasteners and the like, means for supporting a plurality of fasteners with their ends uniformly oriented with respect to each other, a delivery conduit for guiding the fasteners from a point adjacent said supporting means to a predetermined destination, an accumulator, a line which places the accumulator in communication with a source of pressurized fluid, a control valve interposed in said line operable in response to an external signal, a second line placing the accumulator in communication with said delivery conduit, a shut-off valve interposed in said second line, means responsive to the operation of said control valve for separating a single fastener from said supporting means and disposing it in said delivery conduit, said control valve and said shut-off valve being operable to move between open and closed positions in reverse order in timed sequence with the operation of said separating means, whereby a measured charge of pressurized fluid is provided for propelling said fastener disposed within the delivery conduit to its predetermined destination, and a one way valve interposed in the line extending between said accumulator and said control valve so that pressurized fluid will not pass from the accumulator to the control valve.

References Cited in the file of this patent

UNITED STATES PATENTS

| 323,081 | Smith | July 28, 1885 |
| 1,000,023 | Lee | Aug. 8, 1911 |
| 1,703,458 | Ruff | Feb. 26, 1929 |
| 1,948,499 | Bertrand | Feb. 27, 1934 |
| 1,980,967 | Moody | Nov. 13, 1934 |

FOREIGN PATENTS

| 18,109 | Great Britain | Aug. 21, 1903 |